United States Patent
Pandharipande et al.

(10) Patent No.: US 9,903,935 B2
(45) Date of Patent: Feb. 27, 2018

(54) POSITIONING SYSTEM FOR DETERMINING THE LOCATION OF A DEVICE

(71) Applicant: PHILIPS LIGHTING HOLDING B.V., Eindhoven (NL)

(72) Inventors: Ashish Vijay Pandharipande, Eindhoven (NL); Sandeep Shankaran Kumar, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/110,252

(22) PCT Filed: Jan. 2, 2015

(86) PCT No.: PCT/EP2015/050004
§ 371 (c)(1),
(2) Date: Jul. 7, 2016

(87) PCT Pub. No.: WO2015/104224
PCT Pub. Date: Jul. 16, 2015

(65) Prior Publication Data
US 2016/0327629 A1 Nov. 10, 2016

(30) Foreign Application Priority Data
Jan. 7, 2014 (EP) .................................. 14150322

(51) Int. Cl.
G01S 5/02 (2010.01)
H04W 4/02 (2009.01)
(52) U.S. Cl.
CPC .......... *G01S 5/0236* (2013.01); *H04W 4/023* (2013.01)

(58) Field of Classification Search
CPC ............................ G01S 5/0236; H04W 4/023
See application file for complete search history.

(56) References Cited

U.S. PATENT DOCUMENTS 7,852,205 B2 12/2010 Huseth et al.
7,966,021 B2 6/2011 Dietrich et al.
(Continued)

FOREIGN PATENT DOCUMENTS

WO 2013064715 A1 5/2013

OTHER PUBLICATIONS

Hwang, Joengmin, et al., "Detecting Phantom Nodes in Wireless Sensor Networks," Department of Computer Science, University of Minnesota, Minneapolis, IEEE 2007 (5 Pages).
(Continued)

*Primary Examiner* — Kashif Siddiqui
(74) *Attorney, Agent, or Firm* — Meenakshy Chakravorty (57) ABSTRACT

A wireless device comprising: a wireless interface for communicating with a network of reference nodes, and a location module configured to obtain a measurement of a respective signal communicated between the wireless interface and each of a plurality of said reference nodes. The location module is also supplied with a respective set of transformed coordinates for each of said plurality of reference nodes, transformed relative to their actual physical coordinates. Using said signal measurements and the transformed coordinates of said plurality of reference nodes, the wireless device then submits information indicative of a transformed location of the wireless device to an interpretation function. Based on the interpretation function, the wireless device is thereby able to access functionality relating to the physical location of the mobile terminal.

13 Claims, 2 Drawing Sheets (56) References Cited

U.S. PATENT DOCUMENTS

| | | | |
|---|---|---|---|
| 2002/0004399 A1* | 1/2002 | McDonnell | H04W 4/02 |
| | | | 455/456.6 |
| 2003/0023378 A1* | 1/2003 | Ichimura | G01C 21/26 |
| | | | 701/469 |
| 2008/0280626 A1* | 11/2008 | Choi | H04L 63/12 |
| | | | 455/456.1 |
| 2009/0005083 A1 | 1/2009 | Hoshino et al. | |
| 2010/0167758 A1 | 7/2010 | Mukai et al. | |
| 2012/0172055 A1* | 7/2012 | Edge | G01S 5/0018 |
| | | | 455/456.1 |
| 2012/0276920 A1 | 11/2012 | Mangold et al. | |
| 2013/0029685 A1* | 1/2013 | Moshfeghi | G01S 19/48 |
| | | | 455/456.1 |
| 2013/0104228 A1 | 4/2013 | Burnham et al. | |
| 2014/0045522 A1* | 2/2014 | Sugar | H04W 4/023 |
| | | | 455/456.1 |

OTHER PUBLICATIONS

Liu, Hui, et al., "Survey of Wireless Indoor Positioning Techniques and Systems," IEEE Transactions on Systems, Man and Cybernetics, Part C: Applications and Reviews, vol. 37, No. 6, 2007 (14 Pages).

Zhou, Jipeng, et al., "A Secure Distributed Location Service Scheme for Mobile Ad Hoc Networks," IEEE, 2009 (4 Pages).

* cited by examiner

POSITIONING SYSTEM FOR DETERMINING THE LOCATION OF A DEVICE

CROSS-REFERENCE TO PRIOR APPLICATIONS

This application is the U.S. National Phase application under 35 U.S.C. § 371 of International Application No. PCT/EP2015/050004, filed on Jan. 2, 2015, which claims the benefit of European Patent Application No. 14150322.7, filed on Jan. 7, 2014. These applications are hereby incorporated by reference herein.

TECHNICAL FIELD

The present disclosure relates to a positioning system for determining the location of a wireless device, e.g. for providing access to a location-related service such as control of a lighting system in dependence on the device's location.

BACKGROUND

In an indoor positioning system, the location of a wireless device such as a mobile user terminal can be determined with respect to a location network comprising multiple anchor radios. These anchors are wireless nodes whose locations are known a priori, typically being recorded in a location database which can be queried to look up the location of a node. The anchor nodes thus act as reference nodes for location. Measurements are taken of the signals transmitted between the mobile device and a plurality of anchor nodes, for instance the RSSI (receiver signal strength indicator) and/or ToA (time of arrival) of the respective signal. Given such a measurement from three or more nodes, the location of the mobile terminal may then be determined relative to the location network using techniques such as trilateration or multilateration. Given the relative location of the mobile terminal and the known locations of the anchor nodes, this in turn allows the location of the mobile device to be determined in more absolute terms, e.g. relative to the globe or a map or floorplan.

As well as indoor positioning, other types of positioning system are also known, such as GPS or other satellite-based positioning systems in which a network of satellites act as the reference nodes. Given signal measurements from a plurality of satellites and knowledge of those satellites' positions, the location of the mobile device may be determined based on similar principles.

The determination of the device's location may be performed according to a "device-centric" approach or a "network-centric" approach. According to a device centric approach, the mobile device takes measurements of signals it receives from the anchor nodes, obtains the locations of those nodes from the location server, and performs the calculation to determine its own location at the mobile device itself. According to a network-centric approach on the other hand, the anchor nodes are used to take measurements of signals received from the mobile device, and an element of the network such as the location server performs the calculation to determine the mobile device's location. Hybrid or "assisted" approaches are also possible, e.g. where the mobile device takes the raw measurements but forwards them to the location server to calculate its location.

One application of a positioning system is to automatically provide a wireless mobile device with access to control of a utility such as a lighting system, on condition that the mobile device is found to be located in a particular spatial region or zone associated with the lighting or other utility. For instance, access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include indoor navigation, location-based advertising, service alerts or provision of other location-related information, user tracking, asset tracking, or taking payment of road tolls or other location dependent payments.

SUMMARY

It may be desirable to implement a device centric approach in systems where communication bandwidth is expected to be more of a limiting factor than the processing resources of the wireless or mobile devices being located, which is often the case. I.e. rather than incurring the bandwidth required to transmit the multiple "raw" signal measurements to a location server, it may be preferred to instead spend processing resources of the mobile device to process the measurements at the mobile device. For instance in a system comprising many mobile devices, more of the burden is distributed amongst those devices instead of placing such a large burden on the interface between the devices and the server.

If the user of a mobile device wishes to access a service or other function that is dependent on location, the mobile device can then submit the result of its device-centric calculation to the service or function in question (e.g. to gain access to control of the lighting in a room). If this needs to be submitted over a network or wireless interface, then submitting the end result of the location calculation will typically incur less bandwidth than the raw signal measurements. In any case, it is not necessarily the location server that is administering access to the service, so in various network-centric implementations it would be necessary to communicate the location result as well as the raw measurements anyway.

Another option is a partially device-centric hybrid implementation, which may also sometimes be referred to as an assisted approach. For example the mobile terminal may take the signal measurements but submit these raw or partially processed to the location server, for the device's location to be calculated there. This may not save on communication between the mobile device and server, but may have other advantages. For example the assisted approach may still save on communication between the reference nodes and the server.

For any of these or other reasons, it may therefore be desirable to choose a device-centric or at least partially device centric (assisted) approach over a purely network centric approach.

However, conventionally such device centric approaches are also open to potential abuse, in that they rely on the mobile device to submit its own location information in order to gain access to a service or other function. Thus a malicious party may present a false location in order to gain access to a location dependent service or other location related function to which it is not entitled at its actual current location, or which is otherwise not appropriate or intended for its actual current location. For instance a malicious party may falsely present its location as being within a certain region or zone associated with the service, without actually being present at that moment, and the service access system and/or location server may have no means to validate the presented location. E.g. if control of the lighting in a room is dependent on being located within that room, a malicious party may seek to control the lighting from elsewhere in order to cause nuisance or harm to the legitimate occupants.

According to one aspect disclosed herein there is provided mobile device or other wireless device to be located, the device comprising a wireless interface and a location module. The mobile device has some physical location at any given moment, based upon which a location-dependent service or other functionality is to be provided (e.g. access to control of the lighting when in a certain room, or an indoor navigation application, location-based alerts, etc.) The wireless interface is operable to communicate with a network of reference nodes, each being located at a respective set of physical coordinates of a physical (i.e. real-world) coordinate system. The location module is configured to obtain a measurement of a respective signal communicated between the wireless interface and each of a plurality of said reference nodes. Preferably these measurements are taken at the mobile terminal itself based on signals received from the reference nodes (but alternatively in one example of a hybrid or assisted approach they could be taken at each respective reference node based on the signals in the other direction, and then sent to the mobile device).

The location module is also supplied with a respective set of transformed coordinates for each of said plurality of reference nodes. These are a version of the coordinates in an artificial, transformed coordinate system, being transformed relative to the actual physical (real-world) coordinate system. For example, the mapping between the transformed coordinate system and the physical coordinate system may comprise a translation (shift) or a rotation, or a combination of these. Other examples may include a scaling, a reflection, a shear, or a more complex transformation or any combination of such transformations.

Using said signal measurements and the transformed coordinates of said plurality of reference nodes, the location module of the mobile terminal is able to submit information indicative of a transformed location of the mobile device to an interpretation function, and to thereby access the desired location-related functionality based on the physical location of the mobile terminal.

Thus the mobile terminal need only be supplied with a transformed version of the coordinates of the reference nodes in an artificial coordinate system. From these it can be allowed the possibility of calculating its own location in terms of the artificial, transformed coordinate system. However, the mobile terminal need not necessarily be allowed to know the transformation. Thus it need not be allowed the possibility of explicitly calculating and outputting its own actual, real-world location (i.e. its physical location). Instead, the interpretation in relation to the real-world is performed when the mobile terminal submits the information to the interpretation function, and it is this submission that determines access to the functionality in question.

Preferably the interpretation function is implemented on a server, and the location module of the mobile device submits said information to the server over a network for interpretation there. The functionality may comprise a location-based service provided directly by the server, or the server may return a signed token to the mobile device which the device can then submit onwards to a separate location-based service. Alternatively however, it is possible that the interpretation function could be implemented in a "black box" type application on the mobile device, e.g. where that application is providing the location-related functionality based on the device's physical location but does not explicitly output the physical location or does not output it in a form that could be used to trick other applications or services.

In the server based case, preferably the location module on the mobile device is configured to perform the calculation of the transformed location at the mobile device itself, and then submit the transformed location it calculated to the server over a network (but alternatively in another example of an assisted implementation, the information submitted by the mobile device could comprise the raw or partially processed signal measurements and the transformed coordinates of the relevant reference nodes, for the server to both calculate the transformed location and then perform the interpretation there).

In embodiments, the interpretation function comprises a transform function which transforms the artificial, transformed location of the mobile device back into the actual physical coordinate system in order to determine the physical location of the device. For example the server may return the physical location to the mobile device in a signed form, for the mobile device to forward onwards to a location-dependent service to demonstrate its location in a secure manner. However, alternatively it would be possible to interpret the transformed location directly into a decision about whether to provide access to the service or functionality, without needing to explicitly convert the transformed location to a physical location and then interpret the physical location into a decision.

According to another aspect disclosed herein, there is provided server for use in a location system in which measurements of signals communicated between a mobile or wireless device and each of a plurality of reference nodes are used to determine a physical location of the mobile device. The server comprises: a mapping between a respective set of physical coordinates at which each of the reference nodes is located and a respective set of transformed coordinates allocated to each of the reference nodes; and an interface configured to receive information indicative of a transformed location of the mobile device, submitted from the mobile device based on said signal measurements and the transformed coordinates of said plurality of reference nodes. The server further comprises a transform function configured to determine the physical location of the mobile device from said information in accordance with said mapping.

According to another aspect disclosed herein, there is provided a network of reference nodes of a location system, each being located at a respective set of physical coordinates. Each of these reference nodes comprises: a wireless interface configured to transmit a respective signal to a mobile or wireless device having a physical location to be determined, thereby enabling the mobile device to take a measurement of the respective signal; and a storage device storing a respective set of transformed coordinates allocated to the reference node, corresponding to a mapping between the respective set of physical coordinates at which the reference nodes is located and the respective set of transformed coordinates. The wireless interface of the node is configured to transmit the respective set of transformed coordinates to the mobile device, thereby enabling the mobile device to obtain information indicative of a transformed location of the mobile device based on said signal measurements and the transformed coordinates from a plurality of said reference nodes, for the mobile device to submit said information to an interpretation function to access functionality relating to the physical location of the mobile terminal.

In embodiments, the transformed coordinate system maps to the physical coordinate system according to a time varying mapping. This way it is more difficult for a malicious party to try to gradually learn about the transform over time.

According to another aspect disclosed herein, there is provided a corresponding computer-program product for use on a mobile device, server and/or reference node.

According to another aspect disclosed herein, there is provided a system comprising a mobile device, a server and a network of reference nodes having features in accordance with any of the embodiments of these disclosed herein.

BRIEF DESCRIPTION OF THE DRAWINGS

To aid the understanding of the present disclosure and to show how embodiments may be put into effect, reference is made by way of example to the accompanying drawings in which.

DETAILED DESCRIPTION OF EMBODIMENTS

Figure 1:
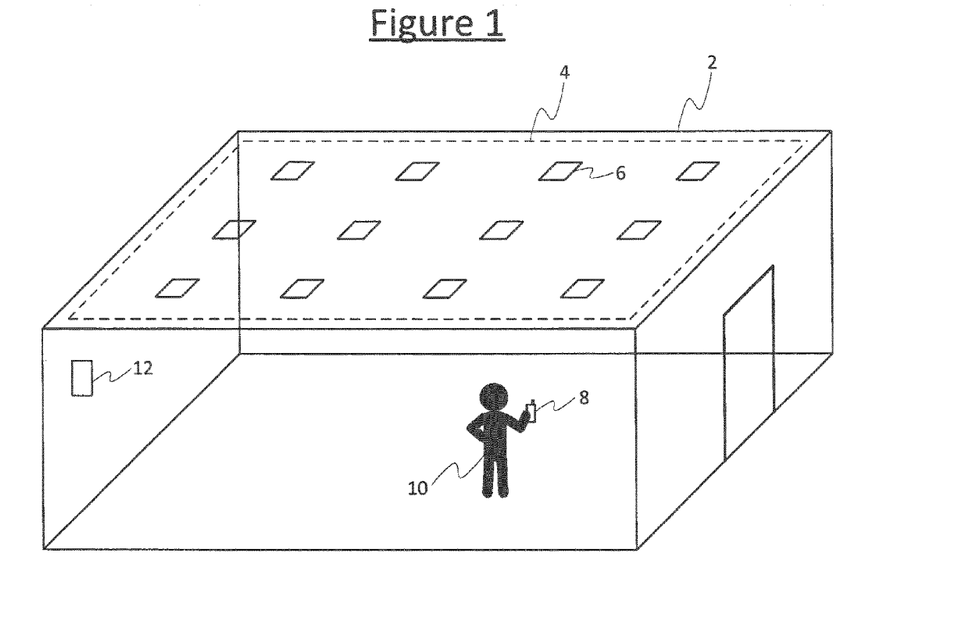
FIG. 1 is a schematic representation of an environment comprising an indoor positioning system.

FIG. 1 illustrates an example of a positioning system installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positing system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings.

In yet further embodiments the reference nodes 6 need not necessarily be installed at fixed locations, as long as their locations can still be known. For example the reference nodes could instead be satellites of a satellite based positioning system such as GPS, GLONASS or Gallileo. The following will be described in terms of the reference nodes 6 being anchor nodes of an indoor positioning system or the like, but it will be appreciated this is not necessarily the case in all possible embodiments. Also, while the disclosure is described in terms of wireless radios, the disclosed techniques may be applied to other modalities such as visible light, ultrasound or other acoustic waves, etc.

The environment 2 is occupied by a user 10 having a wireless device 8 disposed about his or her person (e.g. carried or in a pocket). The wireless device 8 takes the form of a mobile user terminal such as a smart phone or other mobile phone, a tablet, or a laptop computer. At a given time, the mobile terminal 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about object to be tracked, e.g. attached to the object or placed within it. Examples would be such as a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 12 or object about which it is disposed.

Figure 2:
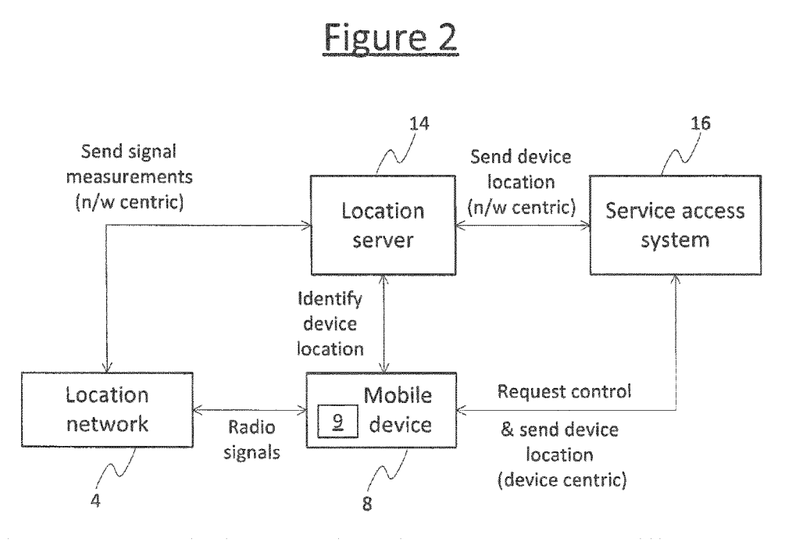
FIG. 2 is a schematic block diagram of a system for providing a location based service.

Referring to FIGS. 1 and 2, the environment 2 also comprises at least one wireless access point or router 12 enabling communication with a location server 14 (comprising one or more server units at one or more sites). The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2. The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi or Zigbee, using which each of the anchor nodes 6 is able to wirelessly communicate via the access point 12 and therefore with the location server 14. Alternatively it is not excluded that the anchor nodes 6 could be provided with a wired connection with the location server 14, but the following will be described in terms of a wireless connection via an access point 12 or the like.

The mobile device 8 is also able to communicate via the wireless access point 12 using the relevant radio access technology, e.g. Wi-Fi or Zigbee, and thereby to communicate with the location server 14. Alternatively or additionally, the mobile device 8 may be configured to communicate with the location server via other means such as a wireless cellular network such as a network operating in accordance with one or more 3GPP standards. Furthermore, the mobile device 8 is able to communicate wirelessly with any of the anchor nodes 6 that happen to be in range. In embodiments this communication may be implemented via the same radio access technology as used to communicate with the access point 12, e.g. Wi-Fi or Zigbee, though that is not necessarily the case in all possible embodiments, e.g. the anchor nodes 6 may alternatively broadcast to the mobile device 8 on some dedicated localization radio technology.

Generally any of the communications described in the following may be implemented using any of the above options or others for communicating between the respective entities 6, 8, 12, and for conciseness the various possibilities will not necessarily be repeated each time.

The mobile device 8 comprises a location module 9 configured to enable the mobile device to operate in accordance with the following. The location module 9 may be implemented in software stored on storage of the mobile device 8 and configured so as when executed on a processor of the mobile device 8 to perform the described operations. Alternatively it is not excluded that some or all of the functionality enabled by the location module 9 may be implemented in dedicated hardware circuitry, or configurable or reconfigurable circuitry.

The signals between the anchor nodes 6 and the mobile device 8 are the signals whose measurements are used to determine the location of the mobile device 8. In a device centric approach the anchor nodes 6 each broadcast a signal and the mobile device 8 listens, detecting one or more of those that are currently found in range and taking a respective signal measurement of each. Each anchor node 6 may be configured to broadcast its signal repeatedly, e.g. periodically (at regular intervals). The respective measurement taken of the respective signal from each detected anchor node 6 may for example comprise a measurement of signal strength (e.g. RSSI), time of flight (ToF), angle of arrival (AoA), and/or any other property that varies with distance or location. In a network centric approach, the mobile device 8 broadcasts a signal and the anchor nodes 6 listen, detecting an instance of the signal at one or more of those nodes 6 that are currently in range. In this case the mobile device 8 may broadcast its signal repeatedly, e.g. periodically (at regular intervals). The respective measurement taken of each instance of the signal from the mobile device 8 may comprise a measure of signal strength (e.g. RSSI) or time of flight (ToF), angle of arrival (AoA), and/or any other property that varies with distance or location. In one example of a hybrid approach, the nodes 6 may take the measurements but then send them to the mobile device 8.

If such a signal measurement is available from each of a plurality of the anchor nodes 6, it is possible to determine the location of the mobile device 8 relative to the location network 10 using a technique such as trilateration, multilateration or triangulation. By combining this relative location with a known location of the anchor nodes 6 used in the calculation, it is then possible to determine the "absolute" location of the mobile device 8. The absolute location may for example refer to a geographic location in terms of the location on a globe or a map, or may refer to a location on a floorplan of a building or complex, or any real-world frame of reference having a wider meaning than simply knowing the location relative to the location network 4 alone. In a device centric approach the mobile device looks up the locations of the relevant nodes 6 by querying the location server 14 (e.g. via the wireless access point 12), or alternatively may receive the respective location along with the signal from each node 6. The mobile device 8 then performs the calculation to determine the absolute location at the device 8 itself. In a network centric approach on the other hand, the nodes 6 submit the signal measurements they took to the location server 14 (e.g. via the wireless access point 12), and the location server 14 performs the calculation of the absolute location at the server 14. In an example of an assisted or hybrid approach, the mobile device 8 may take the measurements of signals from the nodes 6 but submit them in a raw or partially processed form for the calculation to be performed or completed there.

Typically a signal measurement is needed from at least three reference nodes, though if other information is taken into account then it is sometimes possible to eliminate impossible or unlikely solutions based on two nodes. For example, if the location is assumed to be constrained to a single level (e.g. ground level or a given floor of a building), the measurement from any one given node 6 defines a circle of points at which the mobile device 8 could be located. Two nodes give two circles, the intersection of which gives two possible points at which the mobile device 8 may be located. Three nodes and three circles are enough to give an unambiguous solution at the intersection of the three circles (though more may be used to improve accuracy). However, with only two nodes, sometimes it may be possible to discount one of those points as being an unlikely or impossible solution, e.g. being a point in an area to which the user 10 does not have access, or a point that is not consistent with a plotted trajectory (path) of the user 10 (elimination by "dead reckoning"). Similar comments may be made in relation to three-dimensional positioning: strictly four nodes defining four spheres are required to obtain an unambiguous solution, but sometimes an estimate may be made based on fewer nodes if additional information can be invoked. Assuming the user 10 is constrained to a particular level to constrain to a two-dimensional problem is an example of such information. As another example, it may be assumed the user 10 is found one of a plurality of discrete floors, and/or a dead reckoning type approach may be used to eliminate unlikely jumps in the user's route.

By whatever technique the location is determined, this location may then be used to assess whether the mobile device 8 is granted access to some location-based service or other such function. To this end, there is provided a service access system 16 configured to conditionally grant access to the service in dependence on the absolute location of the mobile device 8. In a device centric approach the mobile device submits its determined absolute location (e.g. in terms of global coordinates, map coordinates or coordinates on a floor plan) to the service access system 16 over a connection via the wireless access point 12 or other means such as a cellular connection. The service access system 16 then assesses this location and grants the mobile device 8 with access to the service on condition that the location is consistent with provision of the service (and any other access rules than happen to be implemented, e.g. also verifying the identity of the user 10). In a network centric approach, the location server 14 submits the determined absolute location of the mobile device 8 to the service access system 16, e.g. via a connection over a local wired or wireless network and/or over a wide area network or internetwork such as the Internet. Alternatively the location server 14 may send the absolute location to the mobile device 8, and the mobile device may then forward it on to the service access system 16. In another alternative the service could be provided directly from the location server 14, or could even be implemented on an application running on the mobile device 8 itself.

Note that FIG. 2 shows arrows in all directions to illustrate the possibility of either device centric or network centric approaches, and both approaches are described herein by way of comparison. However, the present disclosure is concerned specifically with a device centric or at least partially device centric (hybrid or assisted) approach where the signal measurements are taken by the mobile device and/or at least some part of the location calculation is performed at the mobile device.

The following are some examples of location-related services or functions that may be provided in accordance with embodiments of the present disclosure:

- allowing control of a utility such as lighting from an application running on the mobile device 8, where the user can only control the lighting or utility in a given room or zone when found to be located in that room or zone, or perhaps an associated zone;
- providing a navigation service such as an indoor navigation service to the mobile device 8 (in which case the location-related function comprises at least providing the device's absolute location to an application running on the mobile device 8, e.g. which the application may then use to display the user's location on a floor plan or map);
- providing location based advertising, alerts or other information to the mobile device 8 (e.g. providing the device 8 with information on exhibits as the user 10 walks about a museum, or information about products as the user 10 walks about a shop or mall); or
- accepting location dependent payments from the mobile device on condition that the device 8 is present in a certain region, e.g. payments in shops, payment of road tolls, "pay as you drive" car rental, or entrance fees to venues or attractions.

For instance, in embodiments the service access system 16 is configured to control access to a lighting network installed or otherwise disposed in the environment 2. In this case the environment 2 comprises a plurality of luminaires (not shown) and a lighting control system comprising the access system 16. The luminaires may for example be installed in the ceiling and/or walls, and/or may comprise one or more free standing units. The luminaires are arranged to receive lighting control commands from the controller. In embodiments this may also be achieved via the wireless access point 12 using the same radio access technology that the anchor nodes 6 and/or mobile device 8 use to communicate with the wireless access point 12, and/or the same radio access technology used to communicate the signals between the mobile device 8 and anchor nodes 6 in order to take the location measurements, e.g. Wi-Fi or Zigbee. Alternatively the lighting controller may communicate with the luminaires by other means, e.g. a separate wired or wireless network. Either way, the access system 16 of the lighting controller is configured with one or more location dependent control policies. For example, a control policy may define that a user 10 can only use his or her mobile device 8 control the lights in certain region such as a room only when found within that region or within a certain defined nearby region. As another example control policy, the mobile device 8 only controls those luminaires within a certain vicinity of the user's current location.

Location-based control of a lighting system may seem like a benign application with little potential for abuse. However, a particular security threat may exist in that a malicious party may try to control lighting when that party is not validly located in the relevant region, such as the room being lit. The malicious party may thus cause harm, disruption or nuisance to legitimate users such as the occupants of the room, owner of the building or organizer of an event, etc. For instance a malicious party could expose occupants to danger by turning off the lights when a room is occupied; or could induce panic, lost productivity or illness such as nausea or epilepsy by controlling the lights erratically; or could deliberately waste resources by turning on the lights when a room is unoccupied.

Other location related services or functions may also be vulnerable to abuse. For example, someone may seek access to location sensitive information to which he or she is not entitled, or may seek to make payments from false locations for money laundering purposes.

For these or other reasons, it would therefore be desirable to try to prevent a malicious party from accessing location related services or functionality by submitting a false location, or to at least make this more difficult.

According to embodiments of the present disclosure, security threats may be mitigated by introducing time-stamped encoding of locations of the anchor nodes 6 in such a way that the mobile device 8 can still make computations on the signal measurements, but does not gain access to true positions that correspond to those measurements, while the location server 14 can validate the actual device position.

Figure 3:
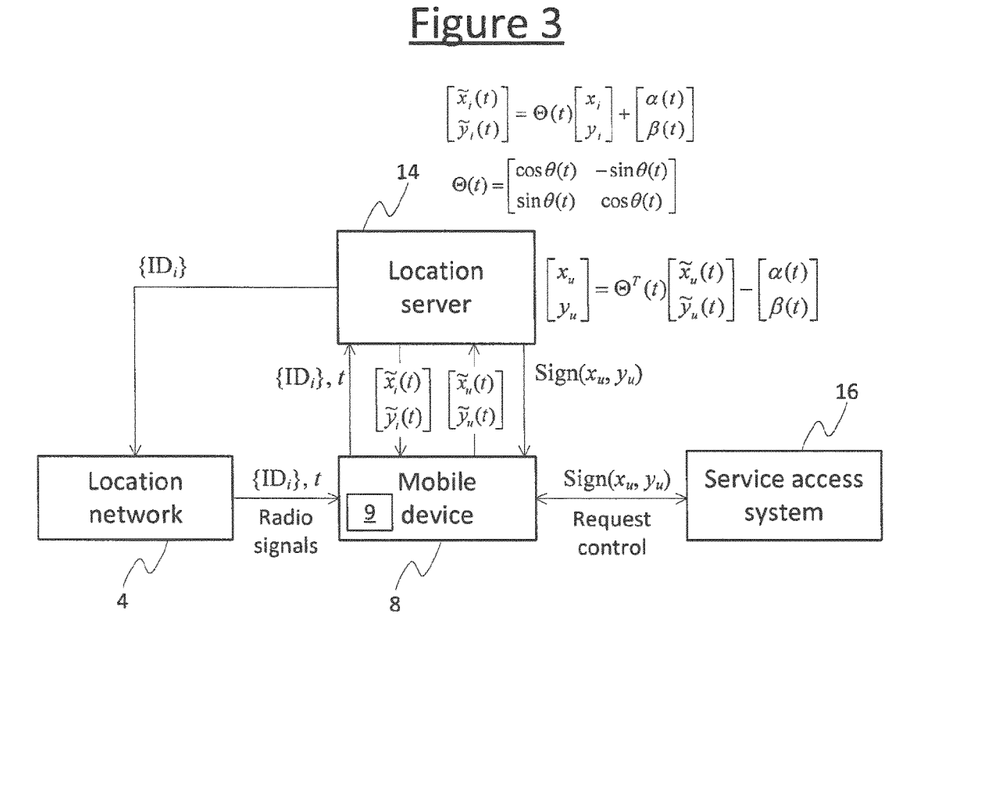
FIG. 3 is another schematic block diagram of a system for providing a location based service.

An implementation of this concept is illustrated in FIG. 3. Each anchor node 6 in the location network 4 has a respective identifier (ID) that is unique amongst the anchor nodes 6 of that location network 4. These IDs may be allocated to the anchor nodes 6 by the location server 14, or at least it is arranged such that the location server 14 stores a record of the same IDs as the anchor nodes 6.

In operation, each anchor device 6 includes only its respective ID in the signal it sends out to the mobile device 8 (i.e. does not send its real location). The ID is labeled $ID_i$ in FIG. 3 where i refers to the respective anchor node 6. The ID may be sent with a time stamp t to indicate the time at which the signal was sent from the node 6, or alternatively the mobile device 8 may add the time stamp to indicate the time at which it was heard. The mobile device 8 then presents the location server 14 with the IDs it hears at its current location, along with the respective time-stamps, and requests the location server 14 to return the locations of the respective anchor nodes 6 identified by the presented IDs.

The location server 14 maintains a mapping of the anchor node 6 locations. In embodiments this is implemented by maintaining a location database in which each entry comprises a mapping between: the $ID_i$ of a respective one of the anchor nodes 6, the actual physical location $(x_i, y_i)$ of the respective anchor node 6 in a physical coordinate system, and a transformed location $(\tilde{x}_i, \tilde{y}_i)$ of that anchor node 6 in a transformed coordinate system (transformed relative to the physical coordinate system). The location database may comprise any kind and size of data structure from a small look-up table upwards, e.g. depending on the extent of the location network 4. Alternatively the mapping may be implemented in the form of an algorithm or analytical formula mapping between the physical locations $(x_i, y_i)$ and the transformed locations $(\tilde{x}_i, \tilde{y}_i)$ (note therefore that mapping does not necessarily imply a database, tabulation or look-up, though those are possibilities in embodiments).

A physical location as referred to herein means the actual, real-world location, and the physical coordinate system refers to an actual, real-world frame of reference. The physical location may for example be expressed in terms of geographic coordinates with respect to the globe or a map, or coordinates with respect to a floor plan of a building or complex, or with respect to any reference framework defined based on one or more features or points in the real world and being meaningful in the real world. The transformed location on the other hand is an artificial location and the transformed coordinate system is an artificial reference framework, not in in themselves being meaningful to the real world without being transformed back to the physical coordinate system.

When the mobile device 8 presents the server 14 with the IDs of the nodes 6 that it can hear at its present location, the location server 14 responds by supplying the mobile device 8 with the transformed coordinates of those nodes 6 (e.g. by looking up the transformed coordinates in the database based on the respective IDs, or running each node's physical location through an analytical formula). However, the location server does not the supply the actual physical coordinates of the nodes 6 to the mobile device 8.

In an alternative variant, each of the anchor nodes 6 may be arranged to receive the transformed version of its own location from the location server 14, and to transmit this to the mobile device 8 along with its respective ID (but neither the server 14 nor the nodes 6 supplies the node's physical location to the mobile device 8). Thus in this variant, the mobile device 8 may skip the step of querying the location server 14 for the (transformed) node locations.

Either way, the mapping is preferably time-varying so that it cannot easily be learned by a malicious party. The location server 14 administers the time-varying mapping, e.g. updating it periodically. In the first variant above, the location server 14 thus supplies the current version of the transformed coordinates to the mobile device 8 as currently in force at the time defined by the submitted timestamp. In the second variant, the location server 14 keeps each anchor node 6 updated with the current version of its respective transformed location, e.g. sending them a new version periodically.

The mapping is such that the mapped positions of the anchor nodes 6 still allow for a consistent intersection of spheres for a given set of distances (or circles if the problem is constrained to two dimensions). In embodiments the mapping may comprise a shift of coordinates (i.e. a translation), a rotation of coordinates, or a linear combination of these. More generally, other examples include performing one or more shifts, rotations, reflections, scaling operations, or shear type operations (skewing of the axes), or any more complex operation(s), or any linear or non-linear combination of these. Note also that coordinate system does not necessarily imply Cartesian coordinates, or even orthogonal coordinates (though these are possibilities). For example in the case of a shear operation the axes may be skewed.

Once provided with the transformed coordinates $(\tilde{x}_i, \tilde{y}_i)$ of the relevant nodes 6 from the location server 14, the mobile device 8 computes its location $(\tilde{x}_u, \tilde{y}_u)$ relative to the transformed node locations $(\tilde{x}_i, \tilde{y}_i)$, which gives only an artificial, transformed version of its location $(\tilde{x}_u, \tilde{y}_u)$ different than its actual physical location in the physical coordinate system. Thus the mobile device 8 is not allowed explicit knowledge of its own physical coordinates.

At this stage there are a number of options for making use of the transformed location. In embodiments the service access system 16 is at least in some sense separate from the location server 14, e.g. run by a different provider than the localization. In such cases, the service access system may expect to receive the location from the mobile device 8. Therefore in embodiments, having calculated the transformed version of its own location in the transformed reference frame, the mobile device 8 submits the transformed version of its location $(\tilde{x}_u, \tilde{y}_u)$ to the location server 14. The location server 14 is configured to provide an interpretation function which, in response to receiving the transformed version of the location $(\tilde{x}_u, \tilde{y}_u)$, interprets this by transforming it back to the physical coordinate system, thus computing the actual physical location $(x_u, y_u)$ based on the transformed version of the device's location $(\tilde{x}_u, \tilde{y}_u)$. This physical location is actual, real-world location of the mobile device 8 (and is also an "absolute" location in the sense discussed above). Note also that the function may implemented as an analytical formula, an algorithm or a look-up, and is not limited in this respect.

The location server 14 then sends a signed version of the actual physical location $(x_u, y_u)$ back to the mobile device 8. The signature is the result of a cryptographic process which serves one or two purposes. Firstly, it may prove the authenticity of the location data as coming from a trusted source, in this case the location server 14 (as opposed to being generated by a malicious party and merely submitted by or through the mobile device 8). Alternatively or additionally, the signature may encrypt the physical location so that a malicious user of the mobile device 8 still cannot access the true location or infer details of the transform.

To gain access to the service, the mobile device 8 then presents the signed location to the service access system 16 which comprises the cryptographic key required to decrypt the physical location data and/or verify its authenticity. On condition of this, the location access service 16 provides the mobile device 8 with access to the service in question, e.g. allowing a request from the mobile device 8 to control some aspect of a utility such as a lighting system.

In alternative embodiments, the mobile device 8 may never be provided with its physical location, not even in signed form. Instead, the service or at least the granting of access to the service may be provided directly from the location server 14 so that the mobile terminal 8 does not need to receive the physical location or submit it to a separate service access system 16. In such embodiments, the location server may interpret the transformed location by transforming it back to the physical coordinate system and then determining whether this physical location is consistent with allowing access to the service. Alternatively, the location server 14 may interpret the transformed version of the device's location by mapping it directly onto a decision about access (e.g. it is programmed with a rule that the device 8 is allowed access on condition that its transformed location in is within one or more particular ranges of coordinates of the transformed coordinate system).

In another alternative, the service access system 16 may be configured with knowledge of the transformed coordinate system, so that it can provide the function of interpreting the mobile device's computer location. In such embodiments, the mobile device 8 may submit the transformed version of its location directly to the location access system 16 to be interpreted, without involving the separate location server 14 in the interpretation. In such embodiments, the service access system 16 may interpret the transformed version of the device's location by mapping it directly onto a decision about whether or not to grant access to the relevant service (e.g. the device 8 is allowed access on condition that its transformed location in is within one or more particular ranges of coordinates of the transformed coordinate system).

In yet further alternative embodiments, the mobile device 8 may submit its transformed location or its server-returned physical location to a local application running on the mobile device 8 itself, rather submitting it to another entity like the location server 14 or location access system 16. The application may be implemented as a "black box" type application which is difficult to reverse engineer. The application then provides the service or function based on the physical or transformed location. For example, the application may receive back the signed, physical location from the server 14 and internally decrypt this, e.g. to unlock some feature of the application or display the location graphically on a local map or floor plan (without explicitly giving away the physical coordinates to the user). Alternatively, the transformed location could be interpreted directly internally within the application (e.g. it provides some feature on condition that the transformed location in is within one or more particular ranges of coordinates of the transformed coordinate system). In such implementations there may be somewhat more risk of a malicious user being able to abuse the location, but the transformation still makes this more difficult as the user does not understand the transformed coordinate system or at least may find it more confusing than a strictly literal, physical coordinate system (especially if the transformation changes over time).

Note: the above has been described in terms of a more-or-less fully device-centric implementation (allowing for the mapping and interpretation by the location sever 14), i.e. where the mobile device 8 both takes the measurements of signals received from the anchor nodes 6 and performs the calculation (e.g. trilateration) to determine its location (albeit in the transformed coordinate system). However, in other embodiments, it is also possible to use the disclosed ideas in a partially device-centric implementation (which may be referred to as a hybrid or assisted approach). In this case the mobile device 8 may perform the signal measurements based on signals from the anchor nodes 6, and also receive the transformed locations from the anchor nodes 6, but then submit these raw or partially processed to the location server 14 for the server 14 to perform the calculation of the device's transformed location (e.g. the trilateration) and the interpretation back into the real-world. Alternatively, the anchor nodes 6 may perform the signal measurements based on instances of a signal they receive from the mobile device 8, but then send these to the mobile device 8 which it may use to calculate its transformed location (e.g. perform the trilateration) at the mobile device 8.

In general given the disclosure herein, it will be seen that idea of providing transformed node coordinates can be used in various ways to make it more difficult for a malicious party to present a false location without knowing about the transform or interpretation.

A detailed example of a mapping between physical coordinate system and transformed coordinate system is now provided by way of illustration. It will be appreciated that this is not limiting, and that other mappings are possible.

In conventional device-centric positioning, the wireless (mobile) device to be located requires knowledge of the locations of the anchor nodes to position itself based on the signal measurements. For convenience, assume for example that the anchor nodes are in the same plane with the $i^{th}$ anchor node at $(x_i, y_i, 0)$, $i=1, \ldots, N$, where N is the number of anchor nodes. Let the mobile device be located at $(x_u, y_u, z_u)$. Based on signal measurements (e.g. RSSI and/or ToF), the mobile device obtains a distance estimate $d_i$ from the $i^{th}$ anchor node. The unknown position $(x_u, y_u, z_u)$ is then a solution of the N non-linear equations:

$$\sqrt{(x_i-x_u)^2+(y_i-y_u)^2+(z_u)^2}=d_i,\ i=1,\ldots,N$$

One way of solving these equations is by subtracting pairs of equations (e.g., N−1 equations subtracted from the first, i=1), thus resulting in N−1 linear equations in $(x_u, y_u)$. Then $(x_u, y_u)$ is a solution of:

$$[x_u, y_u]A = b$$

where $$A = 2\begin{bmatrix} x_1 - x_2 & \ldots & x_1 - x_N \\ y_1 - y_2 & \ldots & y_1 - y_N \end{bmatrix}.$$

Based on its location, secure access may be granted to the user or device 8.

As discussed, a security threat exists in such conventional device-centric positioning, in that the location network and/or service access system cannot verify that a device is reporting its position $(x_u, y_u)$ correctly and not forging or replaying it.

Consider a given time with the device at $(x_u, y_u)$. The i-th anchor device position is $(x_i, y_i)$, and its identity is $ID_i$. The device obtains signal measurements from $ID_i$, $i=1, \ldots, N$ at time stamp t and corresponding to $ID_i$ obtains an estimated distance $d_i$. It presents $ID_i$, $i=1 \ldots N$ with time stamp t to the location server. The location server applies a time-varying mapping on $(x_i, y_i)$, and obtains the corresponding mapped position:

$$\begin{bmatrix} \tilde{x}_i(t) \\ \tilde{y}_i(t) \end{bmatrix} = \Theta(t)\begin{bmatrix} x_i \\ y_i \end{bmatrix} + \begin{bmatrix} \alpha(t) \\ \beta(t) \end{bmatrix}$$

with:

$$\Theta(t) = \begin{bmatrix} \cos\theta(t) & -\sin\theta(t) \\ \sin\theta(t) & \cos\theta(t) \end{bmatrix}$$

where a combination of rotation and translation may be used as the mapping applied on the location coordinates. The location server sends coordinates as the position of $ID_i$ to the device. The mobile device computes position $(\tilde{x}_u(t), \tilde{y}_{u(t)})$ from these coordinates and the distance estimates using some positioning algorithm, e.g. tri-lateration. The computed position is then sent to the location server. The location server then computes the actual position of the mobile device (without requiring knowledge of the estimated distance values), as follows:

$$\begin{bmatrix} x_u \\ y_u \end{bmatrix} = \Theta^T(t)\left(\begin{bmatrix} \bar{x}_u(t) \\ \bar{y}_u(t) \end{bmatrix} - \begin{bmatrix} \alpha(t) \\ \beta(t) \end{bmatrix}\right).$$

The location server may then send a signed version of the position, $Sign(x_u, y_u)$ using public-key signature algorithm (like X.509 certificates based on RSA or DSA) to the mobile device 8, which can then be used by the mobile device to gain service access.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A wireless device having a physical location, the wireless device comprising:
   a wireless interface for communicating with a network of reference nodes, each being located at a respective set of physical coordinates; and
   a location module configured to obtain a measurement of a respective signal communicated between the wireless interface and each of a plurality of said reference nodes, and to be supplied with a respective set of transformed time-varying coordinates for each of said plurality of reference nodes, transformed relative to the physical coordinates;
   wherein the location module is configured, using said signal measurements and the transformed time-varying coordinates of said plurality of reference nodes, to submit information indicative of a transformed location of the wireless device to an interpretation function, and to thereby access functionality relating to the physical location of the wireless device, and
   wherein the location module is configured to receive a respective identifier from each of said plurality of reference nodes, and to be supplied with the transformed time-varying coordinates from a server by submitting the identifiers to the server and receiving the respective sets of transformed coordinates back in response.

2. The wireless device of claim 1, wherein the location module is configured to perform a calculation at the wireless device to determine the transformed location based on said signal measurements and transformed time-varying coordinates, and the information submitted to the interpretation function comprises the transformed location.

3. The wireless device of claim 2, wherein said interpretation function comprises a transform function and the wireless device is configured to submit the transformed location to the transform function to be transformed to the physical location, thereby accessing said functionality relating to the physical location.

4. The wireless device of claim 1, wherein the interpretation function is implemented on a server, the location module of the wireless device being configured to submit said information to the server over a network.

5. The wireless device of claim 1, wherein said functionality comprises the physical location being provided to the wireless device.

6. The wireless device of claim 5, wherein the physical location is provided to the wireless device in a signed form.

7. The wireless device of claim 1, wherein said functionality comprises a location-based service, access to which is conditional on the physical location of the wireless device.

8. The wireless device of claim 6, wherein said functionality comprises a location-based service and the location module is configured to submit the signed form of the physical location to the location based-service, access to which is conditional on the physical location of the wireless device and on verifying the signed form of the physical location submitted by the wireless device.

9. The wireless device of claim 1, wherein the location module is configured to obtain said signal measurements by performing the measurements at said wireless device.

10. The wireless device of claim 1, wherein the location module is configured to be supplied with the transformed time-varying coordinates by receiving the respective sets of transformed time-varying coordinates from each of said plurality of reference nodes.

11. The wireless device of claim 1, wherein the transformed time-varying coordinates map to the physical coordinates according to a time varying mapping.

12. A server for use in a location system in which measurements of signals communicated between a wireless device and each of a plurality of reference nodes are used to determine a physical location of the wireless device, the server comprising:
   a mapping between a respective set of physical coordinates at which each of the reference nodes is located and a respective set of transformed time-varying coordinates allocated to each of the reference nodes;
   an interface configured to receive information indicative of a transformed location of the wireless device, submitted from the wireless device based on said signal measurements and the transformed time-varying coordinates of said plurality of reference nodes; and
   a transform function configured to determine the physical location of the wireless device from said information in accordance with said mapping,
   wherein the server supplies the wireless device with respective sets of the transformed time-varying coordinates after receiving a respective identifier associated with each of said plurality of reference nodes.

13. A location system comprising:
   a wireless device having a physical location to be determined;
   network of reference nodes of a location system, each being located at a respective set of physical coordinates; and
   a server comprising a mapping between a respective set of physical coordinates at which each of the reference nodes is located and a respective set of transformed time-varying coordinates allocated to each of the reference nodes;
   wherein the wireless device is configured to obtain a measurement of a respective signal communicated between the wireless interface and each of a plurality of said reference nodes, and to be supplied with the respective set of transformed time-varying coordinates for each of said plurality of reference nodes; and
   wherein the wireless device is further configured, using said signal measurements and the transformed time-varying coordinates of said plurality of reference nodes, to submit information indicative of a transformed location of the wireless device; and
   the server is configured to transform the transformed location into the physical location, the system thereby providing access to functionality relating to the physical location,
   wherein the wireless device is further configured to receive a respective identifier from each of said plurality of reference nodes, and to be supplied with the transformed time-varying coordinates from the server by submitting the identifiers to the server and receiving the respective sets of transformed coordinates back in response.

* * * * *